(12) United States Patent
Wang et al.

(10) Patent No.: US 8,601,900 B2
(45) Date of Patent: Dec. 10, 2013

(54) SUPPORT MECHANISM AND ROBOT WITH THE SAME

(75) Inventors: Hua-Shuai Wang, Shenzhen (CN); Yong Feng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 296 days.

(21) Appl. No.: 13/117,297

(22) Filed: May 27, 2011

(65) Prior Publication Data

US 2012/0137815 A1    Jun. 7, 2012

(30) Foreign Application Priority Data

Dec. 4, 2010    (CN) .......................... 2010 1 0573503

(51) Int. Cl.
*B25J 17/00*    (2006.01)

(52) U.S. Cl.
USPC .................. 74/490.1; 74/490.02; 248/188.6

(58) Field of Classification Search
USPC .............. 74/490.01, 490.02, 490.03, 490.04, 74/490.05; 248/188.1, 188.6, 440.1, 351, 248/276.1, 282.1
See application file for complete search history.

(56) References Cited

U.S. PATENT DOCUMENTS

| 7,299,713 | B2 * | 11/2007 | Uematsu et al. | 74/490.02 |
| 7,810,764 | B2 * | 10/2010 | Burlot | 248/75 |
| 7,810,765 | B2 * | 10/2010 | Burlot | 248/75 |
| 2004/0035989 | A1 * | 2/2004 | Sweere et al. | 248/127 |
| 2012/0227237 | A1 * | 9/2012 | Tabuchi | 29/428 |

* cited by examiner

*Primary Examiner* — David M Fenstermacher
(74) *Attorney, Agent, or Firm* — Altis & Wispro Law Group, Inc.

(57) ABSTRACT

A support mechanism for a robot includes a support member, and a fixing member. The fixing member is placed on the support member, and includes a V-shaped resilient clip with a fixing groove. A robot securely configured with the support mechanism is also provided when the robot is being transported or stowed when not in service.

8 Claims, 4 Drawing Sheets

SUPPORT MECHANISM AND ROBOT WITH THE SAME

BACKGROUND

1. Technical Field

The present disclosure relates to robots, particularly to a robot with a support mechanism.

2. Description of Related Art

A robot needs to be stably placed on a transport or an appointed location, when it is being transported or not in service. However, the center of gravity of the robot is usually far away from the center of gravity of the robot base, so it is difficult to stably secure the robot in an upright position, and if the robot is placed on its side, surfaces of the robot may be damaged.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
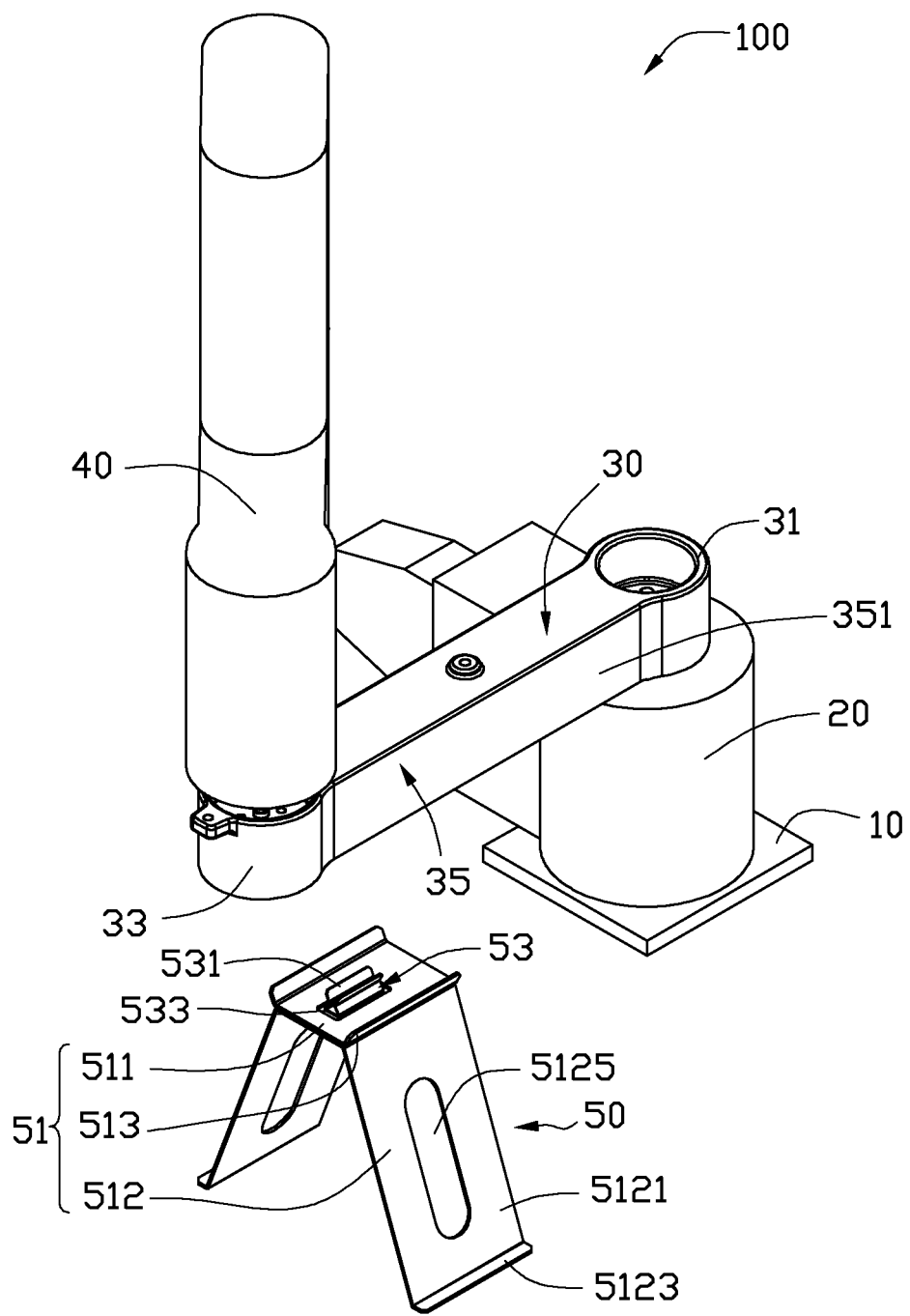
FIG. 1 is a partial, exploded, isometric view of an embodiment of a robot.

Referring to FIG. 1, one embodiment of a robot 100 includes a fixed base 10, a turning base 20, a first segment 30, a second segment 40, and a support mechanism 50. The fixed base 10 is used for mounting the robot 100 on the floor or other support means. The turning base 20 is rotatably fixed on the fixed base 10.

Figure 2:
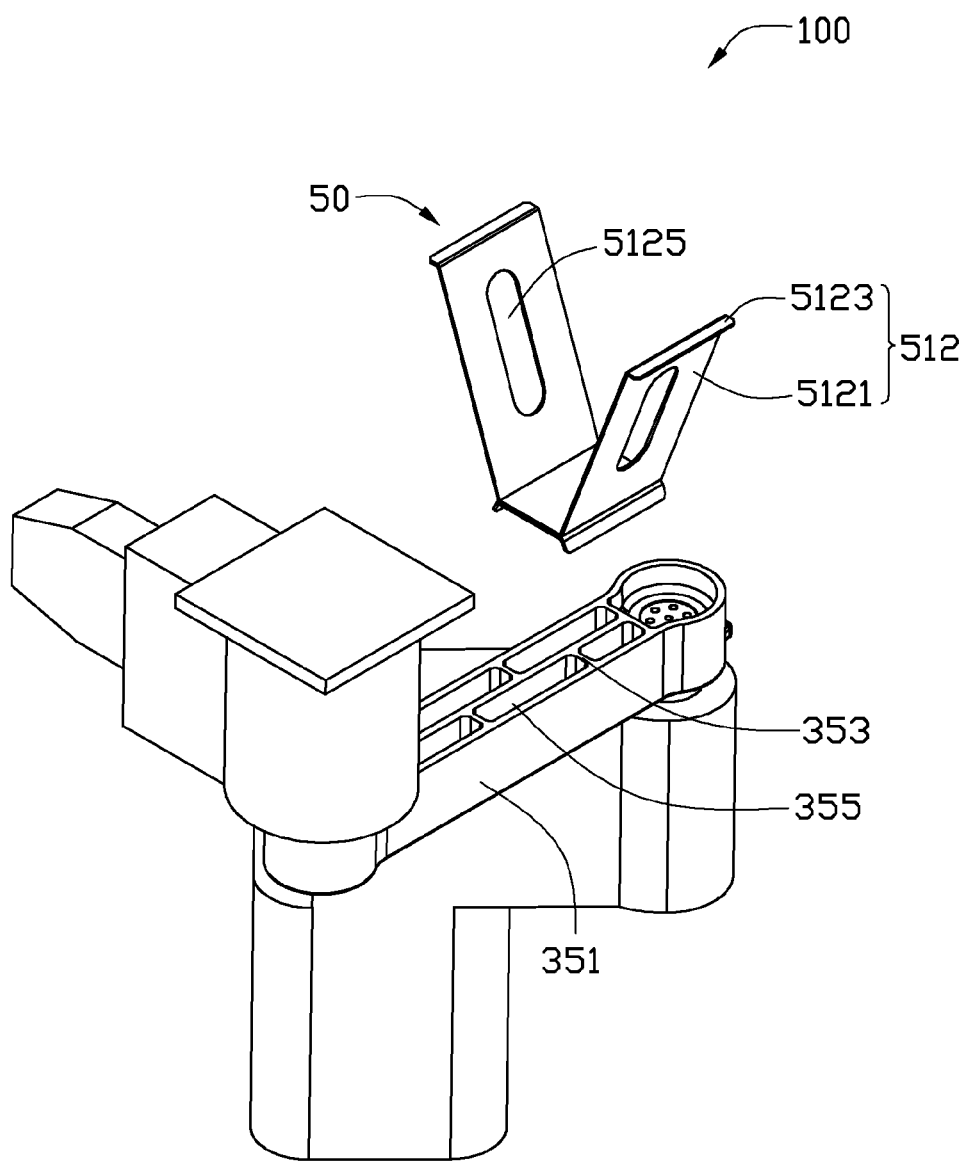
FIG. 2 is similar to FIG. 1, but viewed from another aspect.

Referring to also to FIG. 2, the first segment 30 includes a first connecting end 31, a second connecting end 33, and a connecting portion 35. The connecting portion 35 interconnects the first connecting end 31 and the second connecting end 33. The first connecting end 31 is rotatably coupled to the turning base 20. An end of the second segment 40 is rotatably coupled to the second connecting end 33 of the first segment 30. An operating device (not shown), such as a clamp, a cutter or a detector, is generally positioned on the second segment 40 to realize various operations. The second segment 40 is substantially perpendicular to the first segment 30, so that the center of gravity of the robot 100 is away from that of the fixed base 10. The support mechanism 50 is detachably fixed to and supporting the first segment 30.

The connecting portion 35 includes a main body 351 and a plurality of ribs 353. In this embodiment, the main body 351 is cuboid. A receiving space 355 is defined in the main body 351 and faces the fixed base 10. The ribs 353 are fixed in the receiving space 355, and connect to the sidewalls of the main body 351 for reinforcement.

Figure 3:
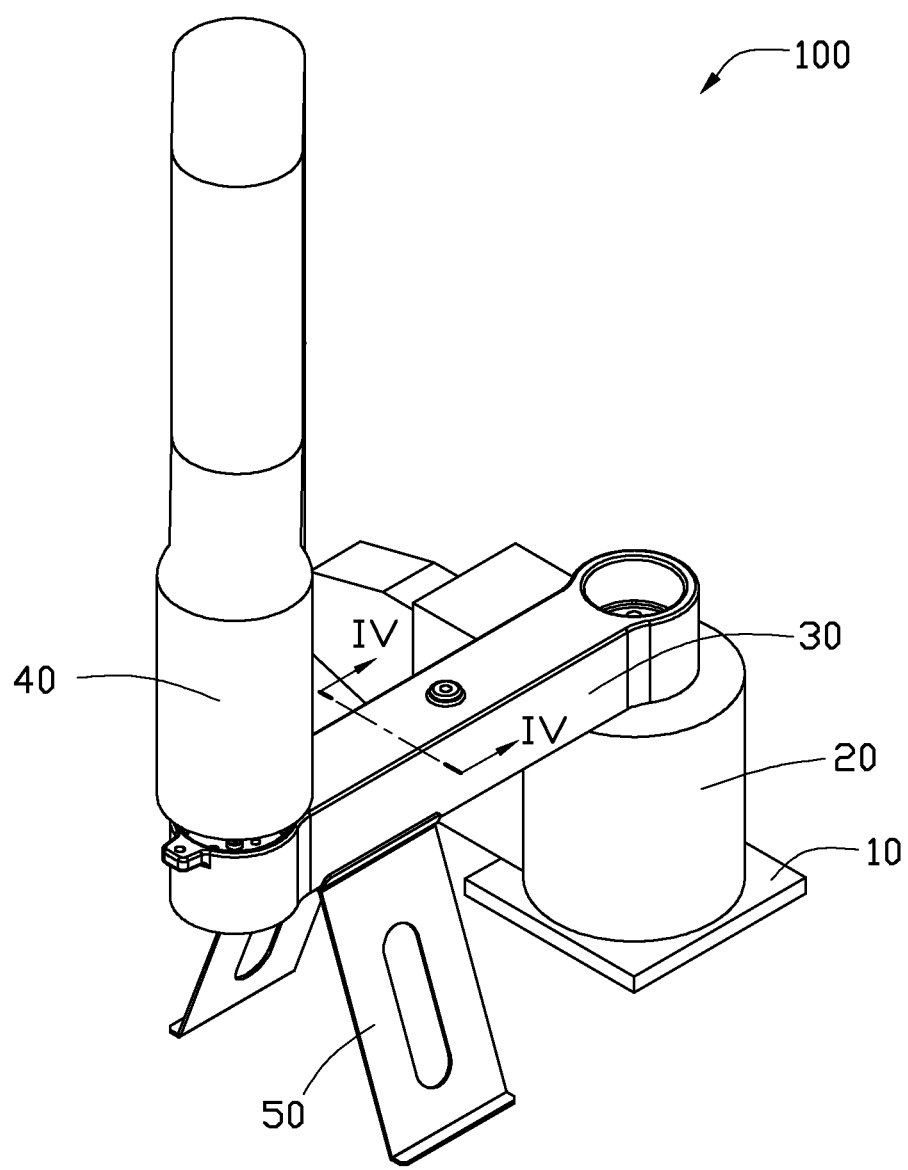
FIG. 3 is an assembled, isometric view of the robot of FIG. 1.
Figure 4:
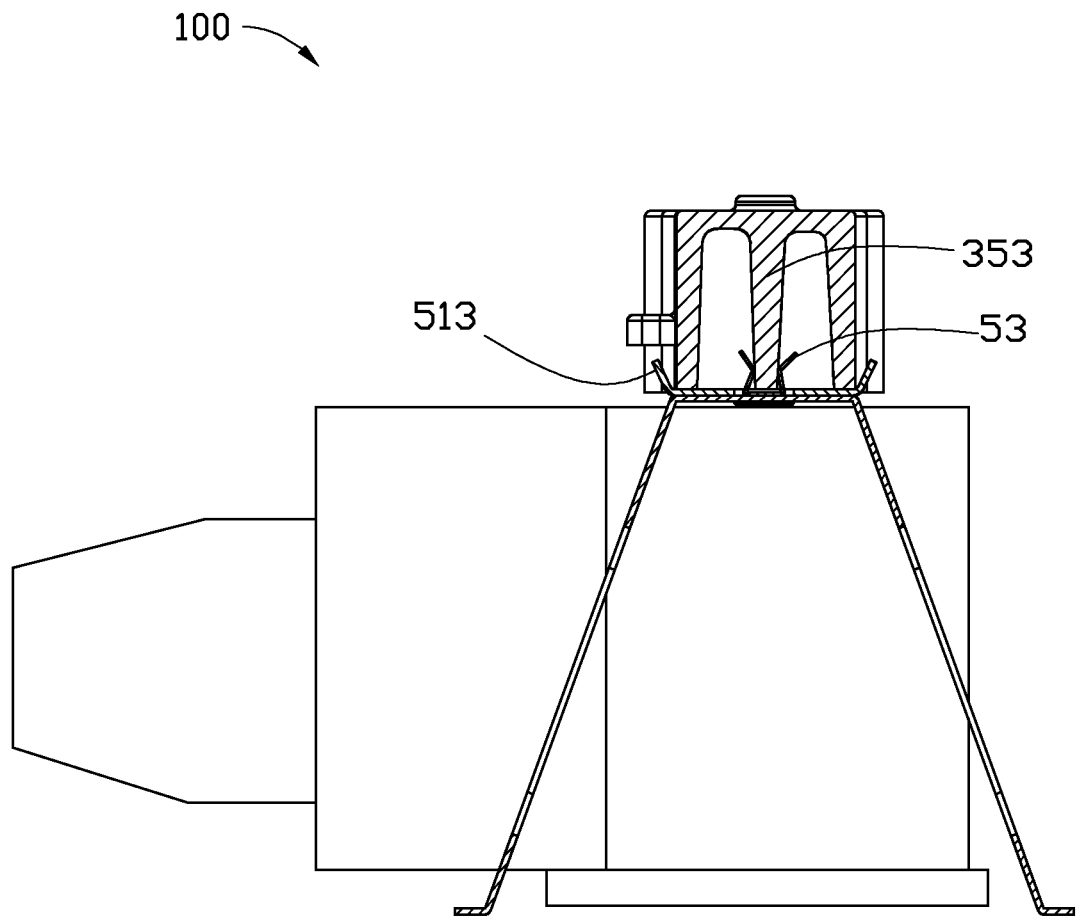
FIG. 4 is a partial, cross-section view of FIG. 3, taken along the line IV-IV.

Referring to FIGS. 1, 3 and 4, the support mechanism 50 includes a support member 51 and a fixing member 53. The support member 51 includes a base 511, two support legs 512, and two stop portions 513. The two support legs 512 extend from opposite edges of the base 511, respectively. Each support leg 512 includes a main body 5121 and a bent portion 5123. One end of the main body 5121 is connected to one end of the base 511. An opening 5125 is defined in the center of the main body 5121, for facilitating handling of the support mechanism 50. The bent portion 5123 extends from one end of the main body 5121 away from the base 511, to contact the floor or other support means. An angle formed between the main body 5121 and the base 511 is greater than 90 degrees. The two stop portions 513 extend from opposite edges of the base 511 away from the support legs 512, respectively, for preventing the first segment 30 from coming apart when joined with the support mechanism 50. In this embodiment, the fixing member 53 is placed on the base 511 away from the support legs, and includes a generally V-shaped resilient clip 531 with a fixing groove 533.

When it is being transported or stowed when not in service, the robot 100 is placed on the transport or on floor for example, the first segment 30 is fixed to the support mechanism 50, and one rib 353 is fixed in the fixing groove 533 of the resilient clip 531. When the robot 100 is needed for performing a task or operation, the support mechanism 50 can be detached from the first segment 30.

Because the fixing member 53 employs a V-shaped resilient clip structure, the first segment 30 can be easily fixed in the fixing groove 533 of the resilient clip 531, and the support mechanism 50 cannot be easily detached from the robot 100, and the robot 100 can be more stably supported. The support mechanism 50 has a simpler structure and lower cost, and does not make the robot 100 more expensive.

It is believed that the present embodiments and their advantages will be understood from the foregoing description, and it will be apparent that various changes may be made thereto without departing from the spirit and scope of the embodiments or sacrificing all of its material advantages, the examples hereinbefore descried merely being preferred or exemplary embodiments.

What is claimed is:

1. A support mechanism for a robot, comprising:
a support member, and
a fixing member, placed on the support member, and comprising a V-shaped resilient clip with a fixing groove, wherein the fixing member detachably directly latches the robot using the resilient clip, the support member comprises a base and two support legs respectively extending from opposite edges of the base toward a first side of the base, the resilient clip is placed on a top surface of the base and faces a second side of the base opposite to the first side of the base.

2. The support mechanism of claim 1, wherein the support member further comprises two stop portions, and the two stop portions extend from opposite edges of the base away from the support legs toward the second side of the base, respectively.

3. The support mechanism of claim 1, wherein each support leg comprises a main body extending from the base and a bent portion extending from one end of the main body away from the base.

4. A robot, comprising,
a fixed base,
a turning base rotatably fixed on the fixed base,
a first segment rotatably coupled to the turning base,
a second segment rotatably coupled to the first segment, and
a support mechanism, comprising a support member and a fixing member placed on the support member, wherein the support member comprises a V-shaped resilient clip with a fixing groove, the first segment is detachably directly latched in the fixing groove, such that the support mechanism is detachably fixed to and supporting the first segment, and the center of gravity of the robot is away from that of the fixed base.

5. The robot of claim 4, wherein the first segment comprises a first connecting end rotataby coupled to the turning base, a second connecting end rotataby coupled to the second segment, and a connecting portion interconnecting the first connecting end and the second connecting end; the connecting portion comprises a main body defining a receiving space and a plurality of ribs received in the receiving space and connecting to the main body, one of the plurality of ribs is detachably latched in the fixing groove.

6. The robot of claim 1, wherein the support member comprises a base, two support legs and two stop portions, the two support legs extend from opposite edges of the base, respectively, and the two stop portions extend from opposite edges of the base away from the two support legs, respectively.

7. The robot of claim 6, wherein each support leg comprises a main body extending from the base and a bent portion extending from one end of the main body away from the base.

8. The robot of claim 6, wherein the fixing member is placed on the base away from the support legs.

* * * * *